United States Patent [19]

Ikoma et al.

[11] Patent Number: 4,935,318
[45] Date of Patent: Jun. 19, 1990

[54] SEALED TYPE NICKEL-HYDRIDE BATTERY AND PRODUCTION PROCESS THEREOF

[75] Inventors: Munehisa Ikoma; Hiroshi Kawano, both of Osaka; Yasuko Ito, Kyoto; Isao Matsumoto, Osaka, all of Japan

[73] Assignee: Matsushita Electric Industrial Co., Ltd., Osaka, Japan

[21] Appl. No.: 171,739

[22] Filed: Mar. 22, 1988

[30] Foreign Application Priority Data

Mar. 25, 1987 [JP] Japan .................................. 62-70609
Nov. 17, 1987 [JP] Japan .................................. 62-290019

[51] Int. Cl.$^5$ ...................... H01M 4/32; H01M 10/34
[52] U.S. Cl. ................................... 429/206; 429/59; 429/223; 29/623.5
[58] Field of Search ................ 429/206, 59, 223; 29/623.5

[56] References Cited

U.S. PATENT DOCUMENTS

| 3,951,686 | 4/1976 | Ness et al. ........................ 429/223 X |
| 3,959,018 | 5/1976 | Dunlop et al. .................... 429/223 X |
| 4,004,943 | 1/1977 | Boter .............................. 429/223 X |
| 4,049,027 | 9/1977 | Seiger et al. ..................... 429/223 X |
| 4,609,599 | 9/1986 | Percheron et al. ................ 429/223 X |

*Primary Examiner*—Stephen J. Kalafut
*Attorney, Agent, or Firm*—Wenderoth, Lind & Ponack

[57] ABSTRACT

A sealed type nickel-hydride battery comprising a positive electrode made of nickel oxides and/or Ni(OH)$_2$ as an active material, a negative electrode made of hydrogen storage alloys as main materials which may absorb and desorb hydrogen as an active material electrochemically, an alkaline electrolyte, and a separator. Prior to sealing in a battery case, the positive electrode contains cobalt and/or cobalt hydroxide having an oxidation potential lower than that of nickel hydroxide and the negative electrode is not subjected to a sufficient precharge as required for the substantial battery capacity to be limited by the capacity of the positive electrode. The battery is sealed in this state, and at an initial charge, the cobalt and/or cobalt oxides are charged and a precharged section absorbed hydrogen is formed in a negative electrode corresponding to the charge capacity of the cobalt and/or cobalt oxides.

14 Claims, 4 Drawing Sheets

SEALED TYPE NICKEL-HYDRIDE BATTERY AND PRODUCTION PROCESS THEREOF

FIELD OF THE INVENTION

The present invention relates to a sealed battery having a negative electrode made of hydrogen absorbing alloys, and particularly to a sealed type nickel-hydride battery for a high energy density comprising a positive electrode using a nickel oxide and/or $Ni(OH)_2$ as an active material mass, a negative electrode composed of hydrogen absorbing alloys as a main material which are able to absorb and desorb hydrogen as an active material mass electrochemically, a separator, and an alkaline electrolyte.

BACKGROUND OF THE INVENTION

As more practical sealed batteries, lead acid batteries and nickel-cadmium batteries are in wide use at present. The former is inexpensive, but in consideration of its weight efficiency/$whkg^{-1}$, cycle life, etc. it is inconvenient to use the lead acid battery as a power source for portable apparatuses of the type for use over a long period of time. On the other hand, through the latter battery is relatively expensive, it has a capability of improving the defects of the former battery, and there is a remarkably increasing demand therefore of late, and in particular the products are of very wide application in fields requiring high reliabilities.

There is an earnest need for batteries of higher energy density employing such characteristic features and usable as a power source for portable appliances. General attention has been recently directed to the nickel-hydride batteries provided with a negative electrode using hydrogen absorbing alloys which are capable of absorbing and desorbing hydrogen as an active material electrochemically instead of cadmium electrode. This particular negative electrode is larger in energy density for a unit volume than that of the cadmium electrode. In this respect, while having the same volume as that of the cadmium batteries, a battery may be constructed with a negative electrode of smaller dimension than that of the cadmium batteries. That is to say, in such a structure, a greater quantity of positive electrode active materials can be used within the open space remaining inside the battery volume so that higher energy density can be realized.

As disclosed in U.S. Pat. No. 4214043, for example, the sealed type nickel-hydride battery is arranged such that its negative electrode is larger than the positive electrode in capacity and that there will always exist a precharged section (electrochemically active portion) at the negative electrode after complete discharge of the positive electrode.

The reason is that as compared with a nickel positive electrode, the negative electrode using hydrogen absorbing alloys is generally inferior in high rate discharge property, and thus a precharged section is disposed at the side of the negative electrode in advance to limit the battery capacity by the capacity of the positive electrode. This may prevent the negative electrode from reaching a fully discharge state or an over-discharge state even after the discharge of the battery, thereby to insure that any determination in cycle life due to a dissolution of the alloys of the negative electrode is avoided.

In this regard, the following methods have been proposed to construct a sealed battery provided with a precharged section at its negative electrode.

(1) As in the cadmium negative electrode, a negative electrode is charged electrochemically in an alkaline aqueous solution to set up a precharged section in the negative electrode, and then the negative electrode is wound in spiral together with a nickel positive electrode through a separator, followed by an infusion of an electrolyte into a case, and the case is sealed to form a battery.

(2) An alloy is ground through a hydrogen absorbing and desorbing operation, and some of the hydrogen used is absorbed into the alloy, i.e. a negative electrode is made of the alloy powders having precharged sections, and a sealed battery is produced in the same manner as described above (Japanese Pat. Laid-Open No. 62-154582).

(3) The positive and negative electrodes are wound in spiral through the separator, and these components are inserted into a cylindrical case with a subsequent infusion of an electrolyte. Then, a quantity of hydrogen gas necessary to establish a precharged section in the negative electrode is filled up inside the battery, and the battery is sealed, and a precharged section is established by a repeated charge and discharge so that a complete battery is formed (U.S. Pat. No. 4314043).

Said methods (1) and (2) require a complicated operation for a conventional negative electrode. Furthermore, in the methods (1) and (2), there is a risk that the active alloy with a lodged hydrogen might be burned by exposure to air prior to formation of a battery, and even if the alloy fails to catch fire, the hydrogen may be dispersed into the atmosphere, thereby to make it difficult to obtain a desired quantity of hydrogen in storage. The method (3) is a method for setting up a precharged section at the negative electrode with a hydrogen gas sealed inside the battery at the formation of the latter, in which the battery must be sealed in a hydrogen gas environment under high pressure, which creates a problem of the production procedures being very complicated.

SUMMARY OF THE INVENTION

The object of the present invention is to provide a sealed type nickel-hydride battery comprising positive and negative electrodes producible by means of a simple process, the battery being of high capacity and distinguished in high efficiency discharge property, in which an essential battery capacity may be limited by the positive electrode capacity.

For the purpose of achieving said object, the present invention provides a process comprising the steps of, prior to a sealing operation, opposing a positive electrode having a characteristic feature (a) wherein a nickel oxide and/or $Ni(OH)_2$ is used as an active material mass, and a negative electrode having a characteristic feature (b) wherein a hydrogen storage alloy is used as a main material, a separator, inserting these components into a case, infusing an electrolyte, and sealing the case in which.

(a) the positive electrode contains cobalt and/or cobalt hydroxide having an oxidation potential lower than that of nickel hydroxides, and (b) the negative electrode has not been subjected to full precharge which is required to limit an essential battery capacity with by the positive electrode capacity.

In the sealed type nickel-hydride battery having the described characteristic features, at the initial charge, the cobalt and/or cobalt hydroxide contained in the positive electrode is charged first to produce stable oxide ($Co_2O_3$ etc.), because its oxidation potential is lower than that of $Ni(OH)_2$ and/or nickel oxides. This specific stable cobalt oxide will have nothing to do with subsequent discharge and charge. Consequently, it follows that the negative electrode, which acts to absorb hydrogen, will be over-charged by the quantity of electricity necessary for oxidation of the cobalt and/or cobalt hydroxide at the initial charge. Namely, the initial charge forms a precharged section at the negative electrode corresponding to the charging quantity of electricity of the cobalt and/or cobalt hydroxide. As a result, a substantial battery capacity is limited with the positive electrode capacity to obtain a high capacity sealed type nickel-hydride battery having a excellent high rate discharge property and a prolonged life.

DETAILED DESCRIPTION OF THE INVENTION

Figure 1:
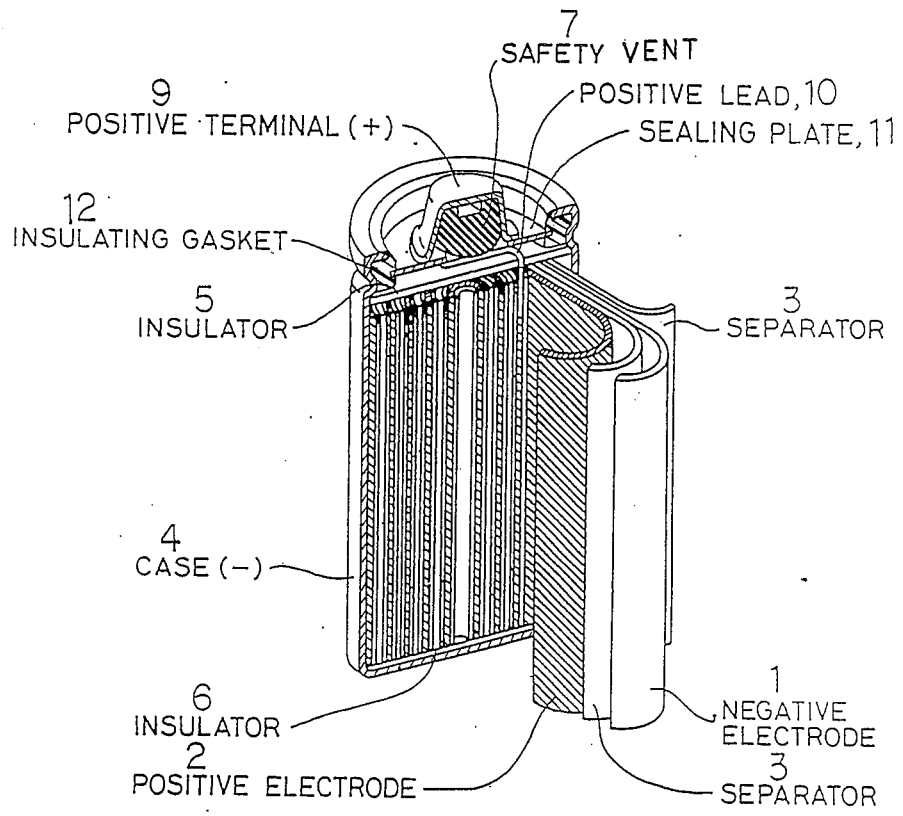
FIG. 1 is a view showing the structure of the sealed battery in accordance with the embodiment of the present invention, in which the positive and negative electrodes are wound in spiral through a separator.

The effect of the present invention will be described with reference to FIGS. 1 to 4 of the drawings.

EXAMPLE 1

In the present invention, substantially ball-shaped powders of $Ni(OH)_2$ with a particle size of 19 μm on average are used as an active material of the positive electrode 2. 100 parts in weight of $Ni(OH)_2$ are mixed with 8 parts in weight of the cobalt powders (made of cobalt carbonyl by reduction) having a potential lower than that of $Ni(OH)_2$ and an average particle size of 5 μm, and then the mixture is kneaded with water to obtain a paste. The paste is filled up in a formed nickel matrix having a three-dimensional network structure and a porosity of about 95% and a thickness of 1.5 mm. After being dried at a temperature of 100° C., this plate is pressed to an average thickness of 0.72 mm, and cut to a dimension of 39 by 65 mm, thereby to obtain a nickel positive electrode containing cobalt powders having an oxidation potential lower than that of $Ni(OH)_2$ with a theoretical capacity of 1070 mAh. According to the same method, a nickel positive electrode can be obtained from a mixture of 100 parts in weight of $Ni(OH)_2$ with 3 parts in weight of $Co(OH)_2$ powders and 5 parts in weight of said Co powders having an oxidation potential lower than that of $Ni(OH)_2$ or from a mixture of 100 parts in weight of $Ni(OH)_2$ with 8 parts in weight of $Co(OH)_2$ powders having an oxidation potential lower than that of $Ni(OH)_2$.

On the other hand, a hydrogen storage alloy which tends to absorb and desorb hydrogen as an active material electrochemically and a negative electrode made thereof are prepared in the following manner.

A misch metal (Mm) mainly composed of about 40% in weight of cerium, about 30% in weight of lanthanum, and about 13% in weight of neodymium, are mixed with a nickel, a cobalt, an aluminum and a manganese weighed out so that an atomic ratio of 1:3.55:0.75:0.3:0.4 may be obtained, and these mixed components are melted in a high frequency furnace to obtain a hydrogen storage alloy composed of $Mm\ Ni_{3.55}Mn_{0.4}Al_{0.3}Co_{0.75}$. Then, this alloy is heat-treated in an atmosphere of Ar at a temperature of 1050° C. to increase the homogeneity of the sample. Afterward, the alloy is ground mechanically into alloy powders having a particle size of 20 μm in average. The alloy powders are kneaded with an aqueous solution containing 1.5% in weight of polyvinyl alcohol into a paste, which is filled up in said formed nickel matrix with a thickness of 0.9 mm. After being dried at 100° C., the formed nickel matrix impregnated with the pasted alloy powders is pressed into a plate with a thickness of 0.5 mm in average. The plate is cut to a dimension of 39 by 80 mm to obtain a negative electrode free from hydrogen as an active material having a theoretical capacity of 1600 mAh.

More generally, the composition of the hydrogen storage alloy may be represented by the formula $MmNi_{x-y}M_y$, wherein Mm is a misch metal, M is at least one element selected from the group consisting of Co, Al, Mn, Fe and Cr which are substituted for a part of the nickel in the alloy, $x > 3.5$, $y > 0$, and $4.7 \leq x+y \leq 5.3$.

The positive and negative electrodes 1,2 formed in this manner are wound in spiral through a separator 3 made of polyamide non-woven fabric for general use and then packed in a case 4 of AA size, into which 2.2 $cm^3$ of 7.1 normal KOH aqueous solution is poured, and finally the case is sealed by sealing plate 11 with positive terminal 9 and saftedly on vent 7. A-1 is a battery employing nickel positive electrode containing said cobalt powders, A-2 is a battery employing nickel positive electrode containing said cobalt and $Co(OH)_2$ powders and A-3 is a battery employing nickel positive electrode containing said $Co(OH)_2$ powders. FIG. 1 is a diagrammatic view of a battery thus made. In FIG. 1, reference numeral 5 is an upper insulator means, 6 is a lower insulator means, positive lead 10 is connected between positive electrode 2 and sealing plate 11, and numeral 12 is an insulating gasket. Since the negative electrode is in a direct contact with the case 4, the latter also acts as a substantially negative terminal.

Figure 2:
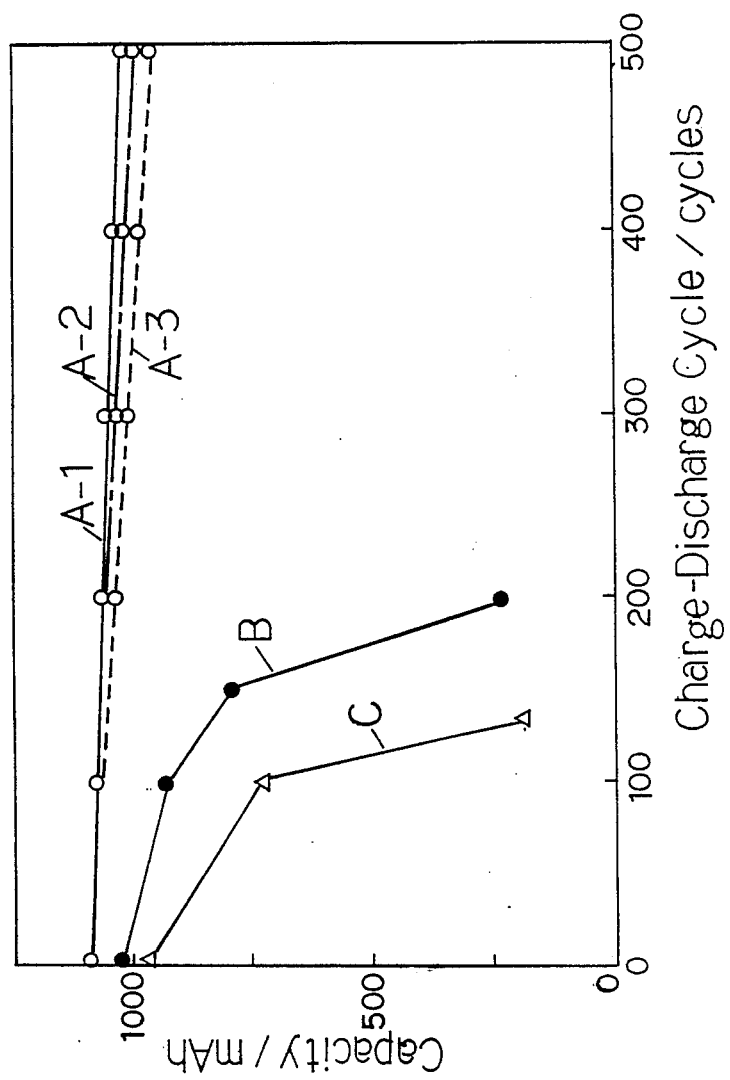
FIG. 2 is a graph showing the charge-discharge cycle life of the sealed type nickel-hydride battery of the present invention using a nickel positive electrode containing cobalt powders (made of cobalt carbonyl by reduction) having a potential lower than that of $Ni(OH)_2$.

Firstly, these batteries are charged with 100 mA in an atmosphere at 20° C. for 15 hours and thereafter, discharged with 200 mA until the voltage reduces to 1.0 V. Then, these batteries are recharged with 330 mA and discharged with constant current of 500 mA, until the voltage is dropped to 1.0 V, which charge and discharge test operation in such a pattern is repeated until the life tests for these batteries are completed. FIG. 2 illustrates the relation between the number of charge and discharge cycles and the discharge capacity of various batteries (A-1, A-2, A-3), that is, results of the cycle life test done as described. A sealed battery (B) including a combination of an alloy negative electrode which has already been charged with about 400 mAh before forming the battery (B) and a positive electrode exclusive of cobalt powders made of cobalt carbonyl by reduction, and a sealed battery (C) comprising an alloy negative electrode which has no a precharged section and a positive electrode in the absence of cobalt powders made of cobalt carbonyl by reduction are utilized as comparative examples.

As a result it has been discovered that the battery (A-1) in accordance with the present invention has such a distinguished charge and discharge cycle life as to almost show no decrease of the discharge capacity irrespective of repetitions of the charge and discharge operations at 500 cycles due to the fact that hydrogen substantially corresponding to the charge capacity of cobalt (which is corresponds to about 350 mAh in this case) remains in the alloy negative electrode after discharge. As in as a battery (A-1), batteries (A-2 and A-3) almost show no decrease of the discharge capacity irrespective of repetitions of charge and discharge operations at 500 cycles due to the fact that the negative electrodes at which hydrogen is absorbed form precharged sections substantially corresponding to the charge capacity of about 250 mAh and about 175 mAh respectively that cobalt and $Co(OH)_2$ powders contained in the positive plate produce stable oxides. On the other hand, a 50% capacity decrease of the initial capacity was seen at about 120-cycle with the battery of example C and at about 180-cycle with the battery of example B. The capacity decrease of the battery B is attributed to the fact that the provision of a precharged section in the negative electrode before sealing of the battery causes dispersion of the majority of the hydrogen, thus resulting in a trace of the hydrogen remaining in the negative electrode of the battery after discharge. In the case of the battery C, it is presumed that since the negative electrode of the battery C indeed excludes a precharged section, some of the metals constituting the hydrogen storage alloy have been so dissolved due to the earlier decrease of the capacity at the negative electrode during discharge.

If the particle size of ball-like shaped nickel hydroxides used is smaller than 10 $\mu$m in average, the crystal structure of nickel hydroxides is broken down in response to increased repetition of charge and discharge, thus resulting in shorter cycle life. Also, it is found when the particle size of said nickel hydroxides used is larger than 30 $\mu$m in average, the utilization of active material decreases, thus resulting in the decrease of energy density. Therefore, the optimum particle size range of said nickel hydroxide is 10-30 $\mu$m in average.

As described above, it is possible to employ the negative electrode without any formation steps (such as charge and discharge, or absorption and desorption of hydrogen) prior to sealing of a battery due to use of the positive electrode containing cobalt and/or $Co(OH)_2$ powders whose oxidation potential is lower than that of $Ni(OH)_2$.

EXAMPLE 2

With the composition of the paste of the positive electrode the same as in Example 1, various positive plates were made of different particle size of cobalt powders within the range of 2 to 20 $\mu$m in average. The cobalt powders show an oxidation potential lower than that of $Ni(OH)_2$ and a fixed amount of the powders was 8 parts in weight. Batteries were constructed employing said positive electrodes in the same process as in Example 1. Table 1 shows the particle size in average of cobalt powders in the positive electrode and the battery numbers.

TABLE 1

| Battery Numbers | Relation between Battery Numbers and Average Particle Sizes | | | | |
|---|---|---|---|---|---|
| | a-1 | a-2 | a-3 | a-4 | a-5 |
| Average Particle Sizes of Cobalt ($\mu$m) | 20 | 15 | 10 | 7 | 2 |

Figure 3:
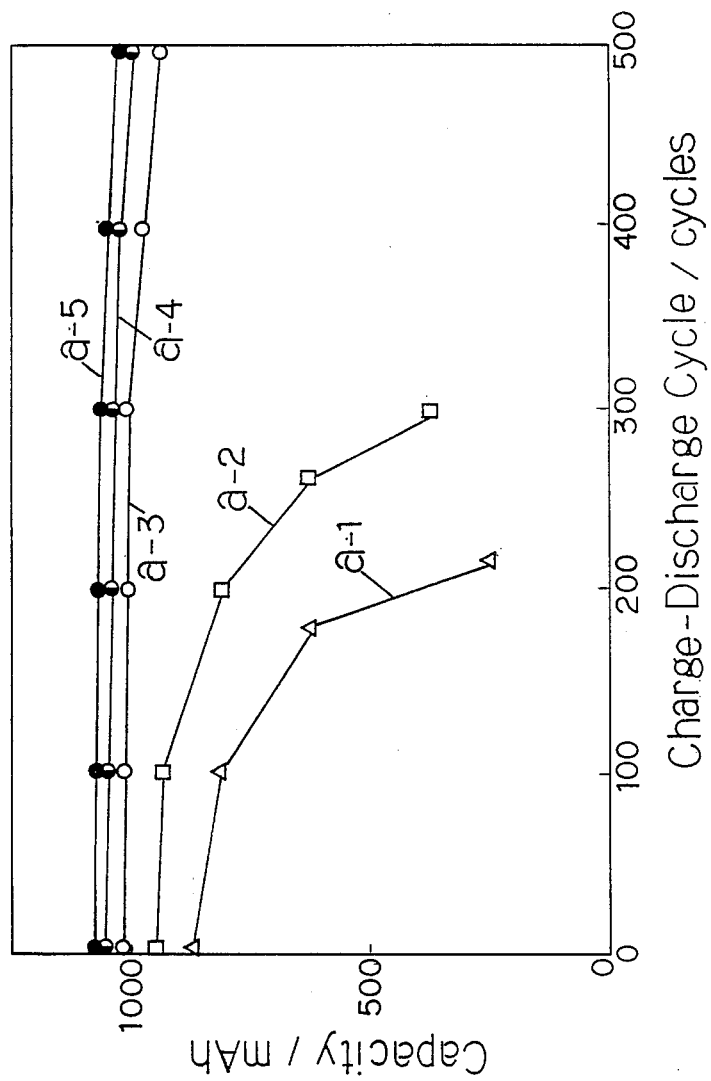
FIG. 3 is a graph showing the cycle life of batteries having positive electrodes containing cobalts of various particle sizes.

FIG. 3 shows a result of a cycle life test conducted for the batteries under the same charge and discharge condition as in the pattern as shown in Example 1. The initial discharge operation has also been performed under the same condition as in Example 1.

The results in FIG. 3 indicate that repeated alteration of charge and discharge with 500-cycle rarely affects the batteries a-3, a-4, and a-5 in their respective capacities, which means that these batteries are involved with a fairly long charge and discharge cycle life respectively. However, with the batteries a-1 and a-2 using the positive electrodes containing an addition of cobalt powders of more than 15 $\mu$m particle size, a great decrease of their capacities is seen due to the repetition of the charge and discharge operations, as compared with the battery a-3, a-4 and a-5. This is because the cobalt having a large average particle size is hard to oxidize electrochemically, namely the particles are not subjected to oxidation to their depth. It follows from this that if the particle size of the cobalt used is more than 10 $\mu$m, the quantity of electricity with which the negative electrode is charged preliminarily at the initial charge will be less than 70 mAh. Consequently, there will remain little amount of the hydrogen within the hydrogen storage alloy constituting the negative electrode after discharge of the battery. Thus, when the battery is through with discharge, a dissolution or oxidation of the metals constituting this alloy will take place; this phenomenon repeatedly occurs in response to a repetition of charge and discharge mode. This has led to a finding that the use of cobalt powders having an average particle size of less than 10 $\mu$m enables prolongation of battery life.

EXAMPLE 3

With the composition of the paste of the positive electrode as in Example 1, various positive plates were made of different amounts of cobalt powders within the range of 1.0 to 15 parts in weight, the cobalt powders having an oxidation potential lower than that of $Ni(OH)_2$ and a fixed particle size of 5 $\mu$m. Batteries were constructed of these positive electrodes in the same process as in Example 1. Table 2 shows the amount of cobalt powders contained in the positive electrode and the battery numbers. Also, Table 2 illustrates $Cc/Cp$ value, $Cc$ representing the chargeable capacity of the cobalt powders and $Cp$ the chargeable capacity of the positive electrode. The chargeable capacity $Cc$ is a value of the quantity of electricity found remaining in the precharged section in the negative electrode at the time when the battery was broken open after being charged with 100 mA for a period of 15 hours and discharged with 200 mA until its voltage dropped to 1.0 V.

TABLE 2

Relation between the Added Amount of Co and Cc, Cc/Cp as well as capacity ratio

| Battery Nos. | Added amount of cobalt | Cc (mAh) | Cc/Cp | Capacity ratio (%) |
|---|---|---|---|---|
| b-1 | 1.0 | 50 | 0.05 | 80 |
| b-2 | 2.0 | 87 | 0.08 | 85 |
| b-3 | 2.5 | 107 | 0.100 | 90 |
| b-4 | 4.6 | 200 | 0.187 | 92 |
| b-5 | 8 | 350 | 0.327 | 92 |
| b-6 | 10 | 429 | 0.40 | 93 | wherein Cp Value is 1070 mAh.

These batteries were subjected to initial charge and discharge in an atmosphere at 20° C. under the same conditions shown in Example 1. Then, in the atmosphere at 20° C. the batteries were recharged with constant current at 100 mA and discharged with constant current at 200 mA until its terminal voltage reduced to 1.0 V in order to determine the nominal capacity. This was followed by another recharging and discharging with 1,000 mA under the same condition to determine the battery capacities reduced to 1.0 V. Capacity ratio was obtained on the basis of a 200 mA discharging capacity. The result is shown by Table 2.

As apparent from Table 2, if the added amount of cobalt powders is under 2.5 parts in weight, the capacity ratio will be less than 90%.

On the other hand, the batteries b-3, b-4, b-5, b-6 have a capacity ratio of more than 90%, thereby showing a distinguished discharge property. The capacity at a discharging operation with 1000 mA for the positive electrode used in this example is 90–93% of the capacity during a discharge with 200 mA. Hence, the batteries b-1 and b-2 have a capacity ratio of under 90%, thus meaning that the battery capacity is limited by the capacity of the negative electrode. Furthermore, life tests were carried out on these b-1 and b-2 batteries in the same procedures as in Example 1 with the result that repetitions of charging and discharging with 200-cycle were found to cause the capacity to be reduced to 50% of the initial capacity. The addition of more than 10 parts in weight of the cobalt powders to 100 parts in weight of positive active materials is assessed to be of a low industrial value in view of its cost. Accordingly, it would be suitable to add 2.5–10 parts in weight of the cobalt powders having an oxidation potential lower than $Ni(OH)_2$ for 100 parts in weight of $Ni(OH)_2$ so that the relationship of $0.1\ Cp \leq Cc \leq 0.4\ Cp$ may remain.

EXAMPLE 4

Various batteries were contructed under the same conditions as in Example 1, having nickel positive electrode made of the same compositions of the paste as in Example 1 except for different added amount of the cobalt powders with an average particle size of 5 μm. Table 3 shows chargeable capacity Cp of the nickel positive electrode and the chargeable capacity Cc of the cobalt powders and the chargeable capacity Cn of the negative electrode used for sampling these sealed batteries prior to the start of an initial charging.

TABLE 3

Relation among Cp, Cc and Cn before start of initial charging

| Battery Nos. | Cp (mAh) | Cc (mAh) | Cn (mAh) | Cn/Cp | Cc/Cp |
|---|---|---|---|---|---|
| c-1 | 1010 | 90 | 1100 | 1.09 | 0.09 |
| c-2 | 1050 | 300 | 1575 | 1.5 | 0.28 |
| c-3 | 1020 | 100 | 1122 | 1.1 | 0.10 |
| c-4 | 1000 | 300 | 2200 | 2.0 | 0.30 |
| c-5 | 920 | 300 | 2208 | 2.4 | 0.33 |
| c-6 | 1000 | 50 | 1700 | 1.7 | 0.05 |
| c-7 | 1010 | 101 | 1717 | 1.7 | 0.10 |
| c-8 | 1000 | 200 | 1700 | 1.7 | 0.20 |
| c-9 | 1000 | 400 | 1700 | 1.7 | 0.40 |

In the atmosphere at 20° C., these sealed batteries were charged for the first time with 100 mA for 15 hours and discharged with 200 mA until the voltage reduced to 1.0 V. Table 4 shows relations among Cp, Cn, and C'c after this one-cycle of charging and discharging. C'c is a value of the capacity of the precharged section of the negative electrode found when the sealed battery was broken apart after finishing one cycle of charging and discharging.

TABLE 4

Relation among Cp, Cn and C'c after one-cycle of charging and discharging

| Battery Nos. | Cp (mAh) | Cn (mAh) | C'c (mAh) | Cn + Cc (mAh) | C'c/Cp |
|---|---|---|---|---|---|
| c-1 | 1010 | 1010 | 90 | 1100 | 0.09 |
| c-2 | 1050 | 1275 | 300 | 1575 | 0.28 |
| c-3 | 1020 | 1022 | 100 | 1122 | 0.10 |
| c-4 | 1000 | 1700 | 300 | 2000 | 0.30 |
| c-5 | 920 | 1808 | 300 | 2208 | 0.33 |
| c-6 | 1000 | 1650 | 50 | 1700 | 0.05 |
| c-7 | 1010 | 1616 | 101 | 1717 | 0.10 |
| c-8 | 1000 | 1500 | 200 | 1700 | 0.20 |
| c-9 | 1000 | 1300 | 400 | 1700 | 0.40 |

It is apparent from Tables 3 and 4 that a precharged section C'c corresponding to Cc has appeared in the negative electrode after the first charge. If the cobalt powders are initially charged with a current density of more than 20 mA/cm², only the surface of the cobalt is oxidized, and the potential turns out to be the one for oxidizing reaction of $Ni(OH)_2$ before the cobalt particles are fully oxidized in its inner portions. Thus, when charging takes place with more than 20 mA/cm², C'c will become so small that C'c corresponding to Cc may not be realized. A current density of less than 20 mA/cm² will allow a full oxidization of the inner portions of the cobalt powders, thereby establishing C'c corresponding to Cc in the negative electrode.

Figure 4:
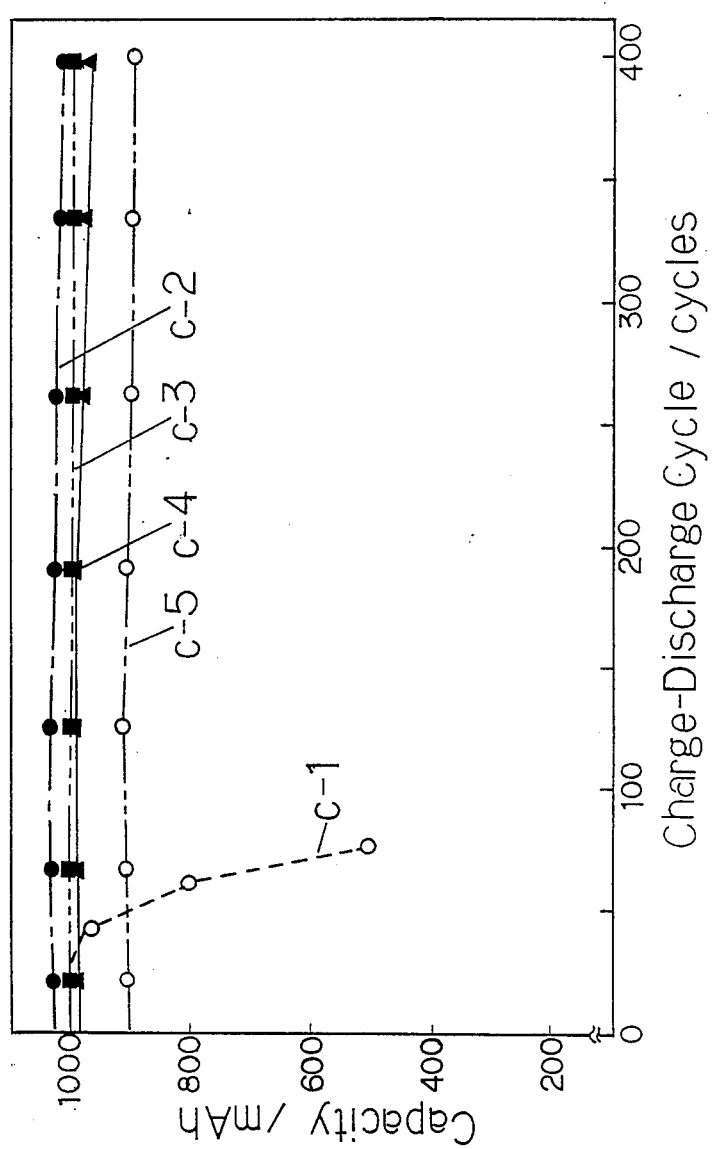
FIG. 4 is a graph showing the cycle life of batteries having positive electrodes containing various amounts of cobalt with a fixed particle size.

FIG. 4 illustrates the results of life tests conducted by the use of batteries c-1, c-2, c-3, c-4, and c-5 of Table 3 for repetition of charges with 330 mA for 4.5 hours at 20° C. and discharges with 500 mA achieved until the voltage reduced to 1.0 V. As apparent from FIG. 4, with the battery c-1, the discharge capacity is decreased to the order of 50% of the initial capacity by repetition of charge and discharge with about 75 cycle. In case of the batteries c-2, c-3, c-4, c-5 in accordance with the present invention, a repetition of charge and discharge with 400-cycle causes no decrease of the discharge capacity. Deterioration of the battery c-1 is explained as follows. The chargeable capacity Cn of the negative electrode is 1.09 Cp before starting of initial charge, however, it reduces to 1.0 Cp at the start of the second charge, because the precharged section of 0.09 Cp at the negative electrode has already been produced at the end of the first charge and discharge. As a result, the chargeable capacity of the negative electrode becomes equal to that of the positive electrode after the first charge and discharge procedure has finished. In this condition, at the final stage of charge, $O_2$ gas which generates from the positive electrode can not be extinguished, moreover, hydrogen gas also is produced at the negative electrode. This will, hence, cause increase of a pressure inside the battery to actuate a safety vent opened in the sealed battery (10–15 kg/cm$^2$), whereby electrolyte or gas leakage may occur and the inner resistance of the battery will increase with a subsequent deterioration of the capacity. Although the battery c-5 having a Cn/Cp value of 2.4 before the first charging operation presents an excellent performance of charge and discharge cycle, it tends to decrease its discharge capacity to some degree as compared with the other batteries in question. With the Cn/Cp value being more than 2.4, it is possible to construct only a battery having under 1.8 times as much capacity as nickel cadmium batteries (capacity 500–600 mAh) of AA size using a sintered nickel positive electrode; such a battery is of less industrial value in view of its production cost.

As described above, it has been found that if the Cn/Cp value is under 1.1 before starting of an initial charge provided that the Cc valve is 100 mAh, or if the value of Cn+Cc is less than 1.1 Cp after the finish of a complete charge and discharge cycle, the cycle life will become shorter, and if the Cn/Cp value is more than 2.4 before charging, or if Cn+Cc is more than 2.4 Cp after the first cycle of full charge and discharge, the energy density will be decreased. Since the cobalt contained in the positive electrode forms a stable oxide by means a charge with a low current of under 20 mA/cm$^2$, a precharge section C'c corresponding to Cc may be formed at the negative electrode by the first charge and discharge process. As a result, a sealed battery whose capacity is limited by the positive electrode capacity can be obtained. Cobalt metal which is lower in oxidation potential than Ni(OH)$_2$ is oxidized at the early stage of initial charging so that precharged sections corresponding to the amount of oxidation of cobalt can be formed in the negative plate. For this purpose, a charging amount at least corresponding to the charging capacity for oxidation of cobalt should be supplied by charging at a current density of 20 mA/cm$^2$ or less. Thus, if an initial charge is desired to finish for a short period of time, it is preferable to perform a charge with a large current of more than 20 mA/cm$^2$ after charging of the cobalt.

INDUSTRIAL APPLICABILITY

As described above, in accordance with the sealed type battery of the present invention, it is possible to provide the negative electrode with a precharged section in a simple process without the necessity of any formation steps (such as charge and discharge, or absorption and desorption of hydrogen) before forming of a battery, and to produce a sealed battery of large capacity. The present invention can provide a sealed battery of large capacity, which is excellent in high rate discharge property and has a prolonged life, and as such, can be of very large industrial value.

What is claimed is:

1. A sealed type nickel-hydride battery of a long cycle line comprising a positive electrode made of at least one of nickel oxide and Ni(OH)$_2$ as an active mass, a negative electrode made of hydrogen storage alloy as main material which may absorb and desorb hydrogen as an active material electrochemically, an alkaline electrolyte, and a separator, wherein prior to sealing
   (a) said positive electrode is in a discharged state containing at least one of cobalt and cobalt hydroxide having an oxidation potential lower than that of nickel oxide and/or Ni(OH)$_2$, and
   (b) said negative electrode is not subjected to a sufficient precharge as required for the long cycle life battery whose capacity is limited by the discharge capacity of the positive electrode.

2. A sealed type nickel-hydride battery as claimed in claim 1, wherein said positive electrode contains at least one of cobalt and cobalt hydroxide powders.

3. A sealed type nickel-hydride battery as claimed in claim 1, where said positive electrode contains at least one of cobalt and cobalt hydroxide fine powders having an average particle size of less than 10 μm.

4. A sealed type nickel-hydride battery as claimed in claim 1, wherein said positive electrode contains at least one of cobalt and cobalt hydroxide so that the relation of 0.1 Cp≦Cc≦0.4 Cp may be retained, Cc being the chargeable capacity of cobalt and/or cobalt hydroxide, having an oxidation potential lower than that of Ni(OH)$_2$ and/or nickel oxide, and Cp being the chargeable capacity of the active materials of said positive electrode.

5. A sealed type nickel-hydride battery as claimed in claim 1, wherein said negative electrode has never been subjected to a charging and discharging.

6. A sealed type nickel-hydride battery as claimed in claim 1, wherein said negative electrode has never been subjected to procedures for hydrogen absorption and desorption.

7. A process for producing a sealed type nickel-hydride battery comprising a nickel positive electrode containing NI(OH)$_2$ and/or nickel oxide as an active mass and cobalt and/or cobalt hydroxide having an oxidation potential lower than that of Ni(OH)$_2$ and/or nickel oxide, a negative electrode containing hydrogen absorbing alloy represented by the formula MmNi$_x$-$_y$M$_y$, said Mm being a misch metal, M being a single element or combined elements selected from the group consisting of Co, Al, Mn, Fe and Cr which are substituted for a part of the nickel in the alloy, x>3.5, y>0, and 4.7≦x+y≦5.3 as a main material capable of absorbing and desorbing hydrogen as an active material electrochemically, a separator, and an alkaline electrolyte, comprising the steps of assembling a positive electrode and a negative electrode and sealing the assembly, wherein said positive electrode is produced by
   (a) kneading a mixture of said nickel hydroxide and Co and/or cobalt hydroxide having a potential lower than that of the nickel hydroxide in a solvent to obtain a paste,
   (b) impregnating, applying or forcing said paste into or on a support matrix to obtain a plate,
   (c) pressing said plate to a predetermined thickness after being dried, and cutting the pressed plate to a determined size, and wherein said negative electrode is produced by
   (a) grinding said hydrogen absorbing alloy into powders,
   (b) kneading said alloy powders in a solvent to obtain a paste and impregnating, applying or forcing said paste into or on a support matrix to obtain a plate, (c) pressing said plate to a predetermined thickness after being dried, and cutting the pressed plate to a determined size.

8. A process as claimed in claim 7, wherein the active material of the positive electrode is $Ni(OH)_2$ with a particle size of 10–30 $\mu$m in average having a ball-like shape.

9. A process as claimed in claim 7, wherein said paste obtained in kneading said alloy powders includes a binder.

10. A process for producing a sealed type nickel-hydride battery comprising a nickel electrode containing $Ni(OH)_2$ and/or nickel oxide and cobalt and/or cobalt compound having an oxidation potential lower than that of the $Ni(OH)_2$ and/or nickel oxide, a negative electrode made of hydrogen absorbing alloy as a main material capable of absorbing and desorbing hydrogen as an active material electrochemically, a separator, and an alkaline electrolyte, said process comprising a step of charging said cobalt and/or cobalt compound at the time of initial charge to form a precharged section in the negative electrode.

11. A process as claimed in claim 10, comprising a step of performing a charge with a current density of less than 20 $mA/cm^2$ at least for the capacity corresponding to the charging quantity of electricity required for oxidization of said cobalt and/or cobalt compound.

12. A process as claimed in claim 10, comprising a step of conducting a charging operation with a current value of less than a potential for oxidation of $Ni(OH)_2$ and/or nickel oxide, at least for the capacity corresponding to the charging quantity of electricity necessary for oxidation of said cobalt and/or cobalt compound.

13. A process as claimed in claim 10, comprising a step of charging the capacity corresponding to Cc so that a relation of $1.1\ Cp \leq Cn + Cc \leq 2.4\ Cp$ may be obtained at the time of termination of a charge of said cobalt and/or cobalt compound or after the termination of a complete discharge, Cn being a chargeable capacity of said negative electrode, Cc being a chargeable capacity of cobalt and/or cobalt compound, and Cp being a chargeable capacity of the active mass of said positive electrode, and a relation of $1.1 \leq Cn/Cp \leq 2.4$ being established before the start of an initial charge.

14. A sealed type nickel-hydride battery of a long cycle life comprising a positive electrode made of at least one of nickel oxide and $Ni(OH)_2$ as an active mass, a negative electrode made of hydrogen storage alloy as main material which may absorb and desorb hydrogen as an active material electrochemically, an alkaline electrolyte, and a separator, wherein prior to sealing
 (a) said positive electrode is in a discharged state containing at least one of cobalt and cobalt hydroxide having an oxidation potential lower than that of nickel oxide, and
 (b) said negative electrode is not subjected to a sufficient precharge as required for the long cycle life battery whose capacity is limited by the discharge capacity of the positive electrode, and at the first charge after sealing
 (a) at least one of said cobalt and cobalt hydroxide is charged first to produce stable oxides which would not contribute anything at discharge, and
 (b) said negative electrode is over-charged by the quantity of electricity necessary for oxidation of at least one of the cobalt and/or cobalt hydroxide, thus producing a precharged part at the negative electrode which leaves a charged part at the negative electrode even after all the active material at the positive electrode is discharged, as a result preventing the degradation of the negative electrode due to over-discharge.

* * * * *